(12) United States Patent
Sasaki et al.

(10) Patent No.: US 8,552,702 B2
(45) Date of Patent: Oct. 8, 2013

(54) DIGITAL CONTROL SWITCHING REGULATOR HAVING AN INPUT VOLTAGE DETECTION CIRCUIT

(75) Inventors: Masahiro Sasaki, Matsumoto (JP); Tetsuya Kawashima, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 275 days.

(21) Appl. No.: 13/039,481

(22) Filed: Mar. 3, 2011

(65) Prior Publication Data
US 2011/0215781 A1 Sep. 8, 2011

(30) Foreign Application Priority Data

Mar. 5, 2010 (JP) ................................. 2010-049208
Oct. 21, 2010 (JP) ................................. 2010-236393

(51) Int. Cl.
*G05F 1/00* (2006.01)

(52) U.S. Cl.
USPC ........................................................ 323/283

(58) Field of Classification Search
USPC ................................................. 323/282–285
See application file for complete search history.

(56) References Cited

U.S. PATENT DOCUMENTS

| 5,424,897 | A | * | 6/1995 | Mietus et al. | ................... 361/92 |
| 5,932,938 | A | | 8/1999 | Shimamori | |
| 6,115,266 | A | | 9/2000 | Matsui et al. | |
| 7,099,164 | B2 | * | 8/2006 | Zhu et al. | .................. 363/21.12 |
| 2002/0125942 | A1 | * | 9/2002 | Dunnebacke et al. | ........... 330/69 |
| 2006/0171175 | A1 | * | 8/2006 | Zhu et al. | .................. 363/21.12 |
| 2006/0291258 | A1 | * | 12/2006 | Zhu et al. | .................. 363/21.12 |
| 2008/0278973 | A1 | * | 11/2008 | Lin et al. | .................. 363/21.08 |
| 2009/0108827 | A1 | * | 4/2009 | Sasaki et al. | .................. 323/299 |
| 2010/0090673 | A1 | * | 4/2010 | Nakagawa et al. | ........... 323/284 |
| 2010/0141320 | A1 | * | 6/2010 | Lin et al. | ....................... 327/198 |

FOREIGN PATENT DOCUMENTS

| JP | 11-113252 A | 4/1999 |
| WO | 97/50165 A1 | 12/1997 |

* cited by examiner

*Primary Examiner* — Jue Zhang
(74) *Attorney, Agent, or Firm* — Rossi, Kimms & McDowell LLP

(57) ABSTRACT

A digital control switching regulator of the invention ON/OFF-controls switching elements by digital-controlled pulse width modulation signals and converts an input voltage to a desired output voltage. The switching regulator includes an input voltage detection circuit that includes: a voltage dividing circuit outputting a divided voltage of the input voltage; a comparator section comparing the divided voltage of the input voltage with a first reference voltage and a second reference voltage and outputting a first comparison signal and a second comparison signal indicating comparison results; and a control section controlling a dividing ratio of the voltage dividing circuit based on the first comparison signal and the second comparison signal to obtain the predetermined divided voltage, thereby outputting an input voltage digital signal corresponding to the input voltage. The input voltage digital signal controls controller coefficients for use in the digital control.

10 Claims, 8 Drawing Sheets

FIG. 3(b) Example of Resistance Array Construction

FIG. 3(a) Resistance Array

DIGITAL CONTROL SWITCHING REGULATOR HAVING AN INPUT VOLTAGE DETECTION CIRCUIT

BACKGROUND OF THE INVENTION

1. Field of the Invention

The present invention relates to a switching regulator that performs voltage conversion by switching with a pulse width modulation signal (hereinafter referred to as a PWM signal), and in particular to a digital control switching regulator having an input voltage detection circuit and suited for control with a digital signal.

2. Description of the Related Art

In switching regulators in general, controller coefficients of a voltage conversion circuit are desired to be set at optimum values corresponding to variation of an input voltage and a load current. For carrying out the controller coefficient optimization, a control mode made by an analogue circuit has a problem in that the analogue circuit requires preparation of a hardware circuit device corresponding to setting values of the controller coefficients, and such a circuit is typically complicated and large-sized.

Patent Document 1 discloses a switching regulator in a digital control mode to provide a technology to avoid the enlarged circuit size. FIG. 8 shows an example of construction of a conventional digital control switching regulator, which is disclosed in Patent Document 1.

Referring to FIG. 8, input ac power AC is, through an input filter 21, fed to a rectifying and smoothing circuit 22 composed of a full-wave rectifying diode circuit 23 and a capacitor Ci, and supplied to a transformer unit 24 with a switching circuit. The transformer unit 24 with a switching circuit performs ON/OFF control by a switching element QN on the supplied power from the rectifying and smoothing circuit 22. The ON/OFF output is coupled with an output circuit 26 through a transformer 25. The output circuit 26 consisting of diodes D1, D2, inductor L, and capacitor Co converts the switching output that is supplied by the transformer unit 24 with a switching circuit to a dc voltage and outputs the converted output. The output voltage Vout is supplied to a load circuit 8.

The output from the output circuit 26 is taken out as an output voltage analogue signal AS1, and the output from an output current detection circuit 27 is taken out as an output current analogue signal AS2. The output voltage analogue signal AS1 and the output current analogue signal AS2 are fed to a digital control unit 28. A control output from the digital control unit 28 is fed to the switching element QN, a component of the transformer unit 24 with a switching circuit. The switching element QN operates to determine a duty ratio, a ratio of ON time to OFF time in a switching period.

The digital control unit 28 converts the input signals of the output voltage analogue signal AS1 and the output current analogue signal AS2 into an output voltage digital signal and an output current digital signal, and executes operation of a command value for determining the duty ratio of the transformer unit 24 with a switching circuit based on the output voltage digital signal and the output current digital signal together with input voltage information or load terminal voltage information. The input voltage information or the load terminal voltage information is estimated from the output voltage digital signal and the output current digital signal.

The digital control unit 28 generates pulses based on the command value obtained by the operation and controls switching operation of the transformer unit 24 with a switching circuit by the fed pulses, thereby controlling an output voltage and an output current.

The input voltage information necessary for executing the command value operation is estimated by the following formulas (1), (2), and (3). An equation in a discrete variable system applied to a digital processing in FIG. 8 is represented by Formula (1) below:

[Formula 1]

$$Vi(n-1)=L[i(n)-i(n-1)]/Tc+Vo(n-1) \qquad (1)$$

wherein $Vi(n)$ is a mean voltage between a time (n−1) and a time n at a position indicated in the output circuit 26 in FIG. 8, L is an inductance, $i(n)$ and $i(n-1)$ are inductor current values at a time n and a time (n−1), respectively, Tc is a sampling period, and $Vo(n-1)$ is an output voltage at a time (n−1).

Provided the sampling period Tc be k times the switching period T (k is an integer) and an ON time duration of the switch be Ton in the switching period T, the relation represented by the following Formula (2) holds between the mean voltage $Vi(n-1)$ and the input voltage $V(n-1)$.

[Formula 2]

$$Vi(n-1)=k \cdot Ton \cdot V(n-1)/Tc \qquad (2)$$

From Formula (1) and Formula (2), an actual current $i(n)$ at the time n is given by the following Formula (3).

[Formula 3]

$$i(n)=i(n-1)+Tc \cdot [k \cdot Ton \cdot V(n-1)/Tc-Vo(n-1)]/L \qquad (3)$$

Thus, Patent Document 1 states that the optimum control can be carried out corresponding to variation of an input voltage and an output current by operational estimation of the input voltage based on the formulas (1), (2), and (3) using the detected values of output voltage analogue signal AS1 and output current analogue signal AS2.

[Patent Document 1] WO97/50165.

The above-mentioned conventional digital control switching regulator, however, has the problems as follows.

The digital control unit 28 performs the control by executing an operation for the command value to determine the duty ratio of the switching regulator based on the detected values of output voltage analogue signal AS1 and output current analogue signal AS2. However, since the input voltage information used for executing the operation is an estimated value based on the output voltage and the output current, there is a problem of causing an error. An inductance value, which is necessary for the estimation operation, is generally decided by the user side and thus, an uncertain factor. Since the control is conducted by the operation that uses an estimated value and an uncertain factor, the digital control switching regulator cannot perform optimum control.

SUMMARY OF THE INVENTION

In view of the above-described problems, it is an object of the present invention to provide a digital control switching regulator that performs optimum control based on input voltage information by means of provision of an input voltage detection circuit that accurately detects an input voltage thereby avoiding detection of an inductance value and an output current value.

In order to accomplish the above object, a digital control switching regulator of the present invention comprises an input voltage detection circuit that includes: a voltage dividing circuit outputting a divided voltage of the input voltage; a comparator section comparing the divided voltage with a first reference voltage and a second reference voltage and outputting comparison signals indicating comparison results; and a control section controlling a dividing ratio of the voltage dividing circuit based on the comparison signals to obtain the predetermined divided voltage thereby outputting an input voltage digital signal that indicates a magnitude of the input voltage, the input voltage digital signal controlling controller coefficients for use in the digital control.

The voltage dividing circuit comprises a resistance array having variable resistance circuits and a resistance element, the both provided between the input voltage and a ground potential, the voltage dividing circuit outputting a divided voltage of the input voltage from the resistance array. The comparator section comprises a first reference voltage source and a second reference voltage source, and a first comparison circuit and a second comparison circuit comparing the divided voltage with the first reference voltage and with the second voltage, respectively, to output the comparison signals. The control section controls the dividing ratio of the divided voltage based on the comparison signals for setting the divided voltage to lie between the first reference voltage and the second reference voltage, and generates the input voltage digital signal depending on the dividing ratio.

The input voltage detection circuit further comprises a timer circuit setting a detection period for detecting the input voltage The resistance array comprises a series-connected circuit of a first variable resistance circuit, a second variable resistance circuit, and the resistance element. The voltage dividing circuit further comprises a switching element that is series-connected to the resistance array. The first variable resistance circuit and the second variable resistance circuit each comprises a plurality of series-connected pairs of a resistance element and a switch, the both being connected in parallel with each other, and the resistance element having a weighted resistance value. Each of the switches of the first variable resistance circuit and corresponding member of the switches of the second variable resistance circuit are complementarily ON/OFF-controlled by the input voltage digital signal.

Embodiments of a digital control switching regulator of the present invention obtains accurate input voltage information by the input voltage detection circuit without detection of an inductance value and an output current value, thereby performing optimum control based on the input voltage information. As an additional effect, low power consumption is achieved by cutting off the current path in the voltage dividing circuit that composes the input voltage detection circuit except for the time of detection operation for the input voltage.

DETAILED DESCRIPTION OF THE INVENTION

Some preferred embodiments of the digital control switching regulator according to the present invention will be described in the following with reference to the accompanying drawings.

EXAMPLE 1

Figure 1:
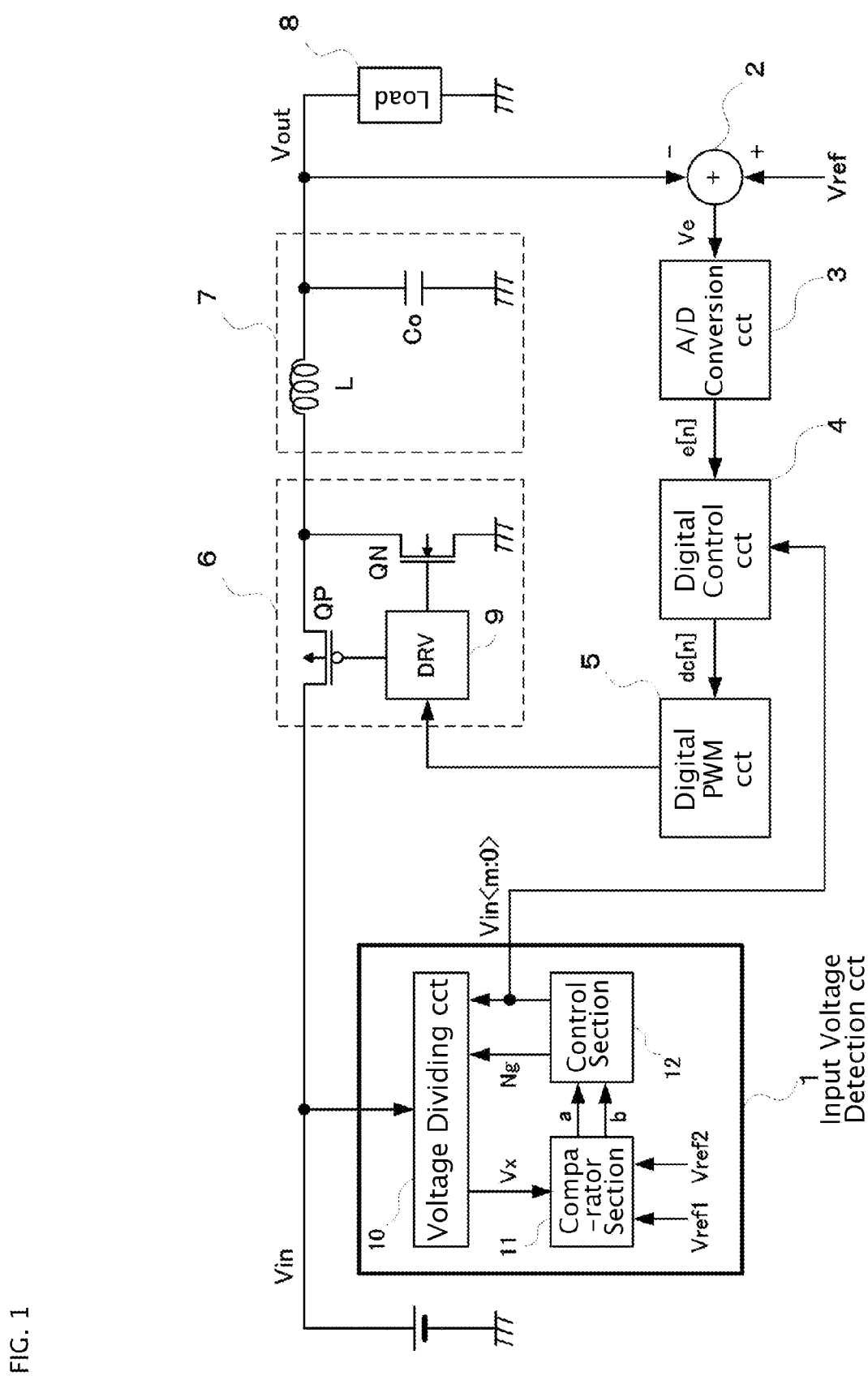
FIG. 1 shows an example of construction of a digital control switching regulator according to the present invention.
Figure 8:
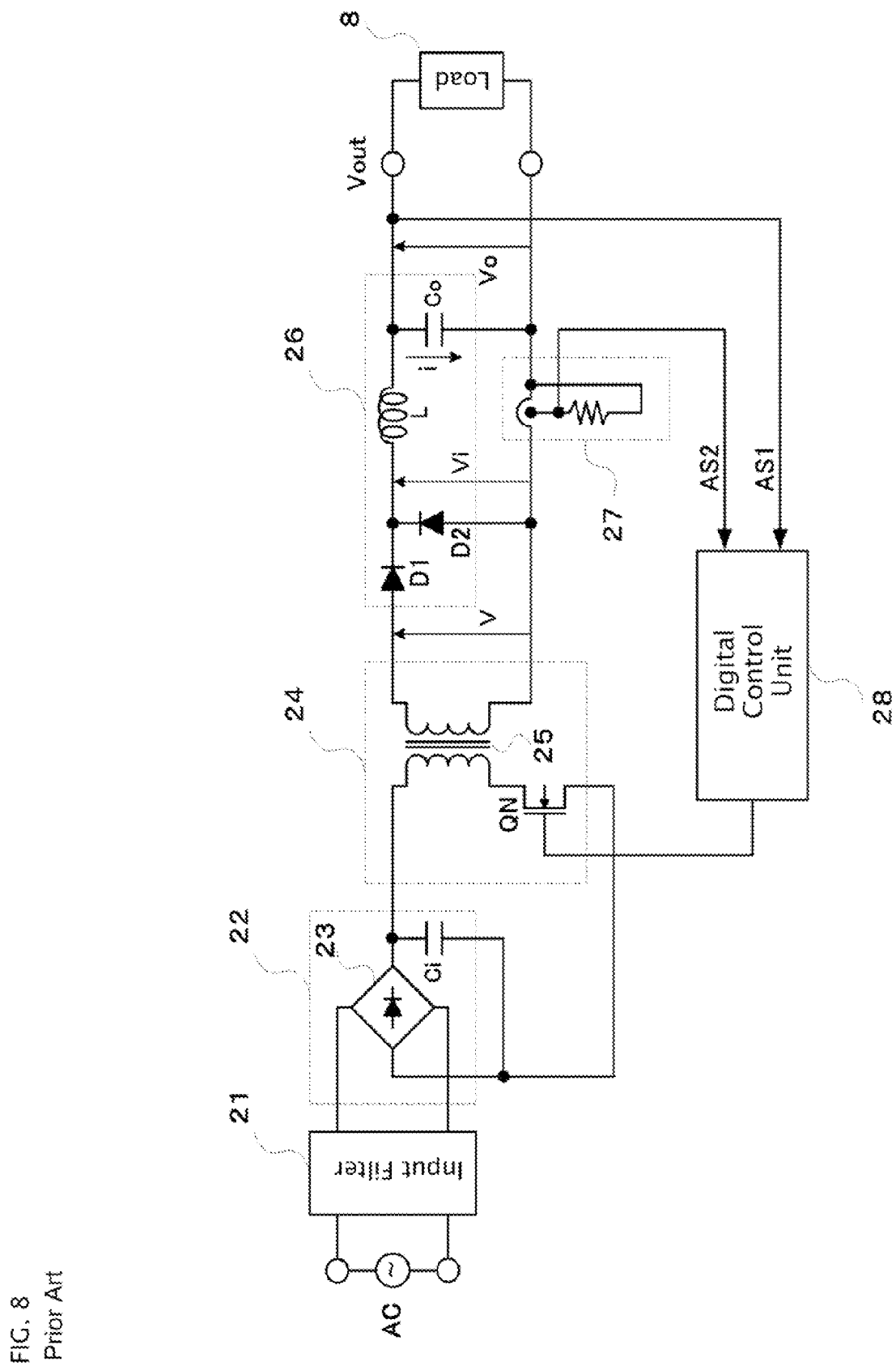
FIG. 8 shows an example of construction of a conventional digital control switching regulator.

FIG. 1 is a block diagram showing a construction of a digital control switching regulator in accordance with embodiments of the invention. Parts that are similar to those in the construction of the conventional switching regulator shown in FIG. 8 are given the same symbols and detailed description is omitted.

The example of the digital control switching regulator of FIG. 1 has a construction in a voltage mode to convert an input voltage Vin into an output voltage Vout by controlling switching elements with a PWM signal. The digital control switching regulator comprises an input voltage detection circuit 1, a subtractor 2, an ND convertor circuit 3, a digital control circuit 4, a digital PWM circuit 5, an output circuit 6 composed of a driving circuit 9 and a pair of switching elements QP and QN that are ON/OFF-controlled by the driving circuit 9, and a smoothing circuit 7 composed of an inductor L and a capacitor Co. The symbol Vin represents a power source for inputting an input voltage Vin (the same symbol Vin is used for the input voltage and for the input power source) to the digital control switching regulator. The load circuit 8 is a load on the switching regulator.

The input voltage detection circuit 1 as shown in FIG. 1 is provided with a voltage dividing circuit 10, a comparator section 11, and a control section 12, and outputs a binary input voltage digital signal Vin <m:0> that is converted from the detected input voltage Vin, in which m:0 represents $2^m$ to $2^0$. The subtractor circuit 2 generates and outputs an error voltage Ve between a detected value of the output voltage Vout that is to be fed back and a reference voltage Vref, which is a target value. Here, the detected value of the output voltage Vout can be the detected output voltage itself, a divided output voltage, or a level-shifted output voltage and thus, the error voltage Ve can be (Vref−Vout), (Vref−K1*Vout), or (Vref−(Vout−K2)), wherein K1 and K2 are positive constants. The A/D convertor circuit 3 outputs a binary digital error signal e[n] that is converted from the error voltage Ve, in which [n] means that the signal is a value at an n-th switching period. The digital control circuit 4 executes operation and outputs a duty command signal d[n] for determining a duty ratio of a PWM signal by an operation according to a scheme of PID control (proportional-integral-and-derivative control) or PI control (proportional-and-integral control) based on the inputted digital error signal e[n] and the inputted input voltage digital signal Vin <m:0>. The digital PWM circuit 5 generates and outputs a PWM signal based on an inputted duty command signal d[n]. The output circuit 6 conducts ON/OFF control of the switching elements QP and QN according to the PWM signal. The smoothing circuit 7 makes the output from the output circuit 6 smooth and generates an output voltage Vout, which is supplied to the load circuit 8.

Figure 2:
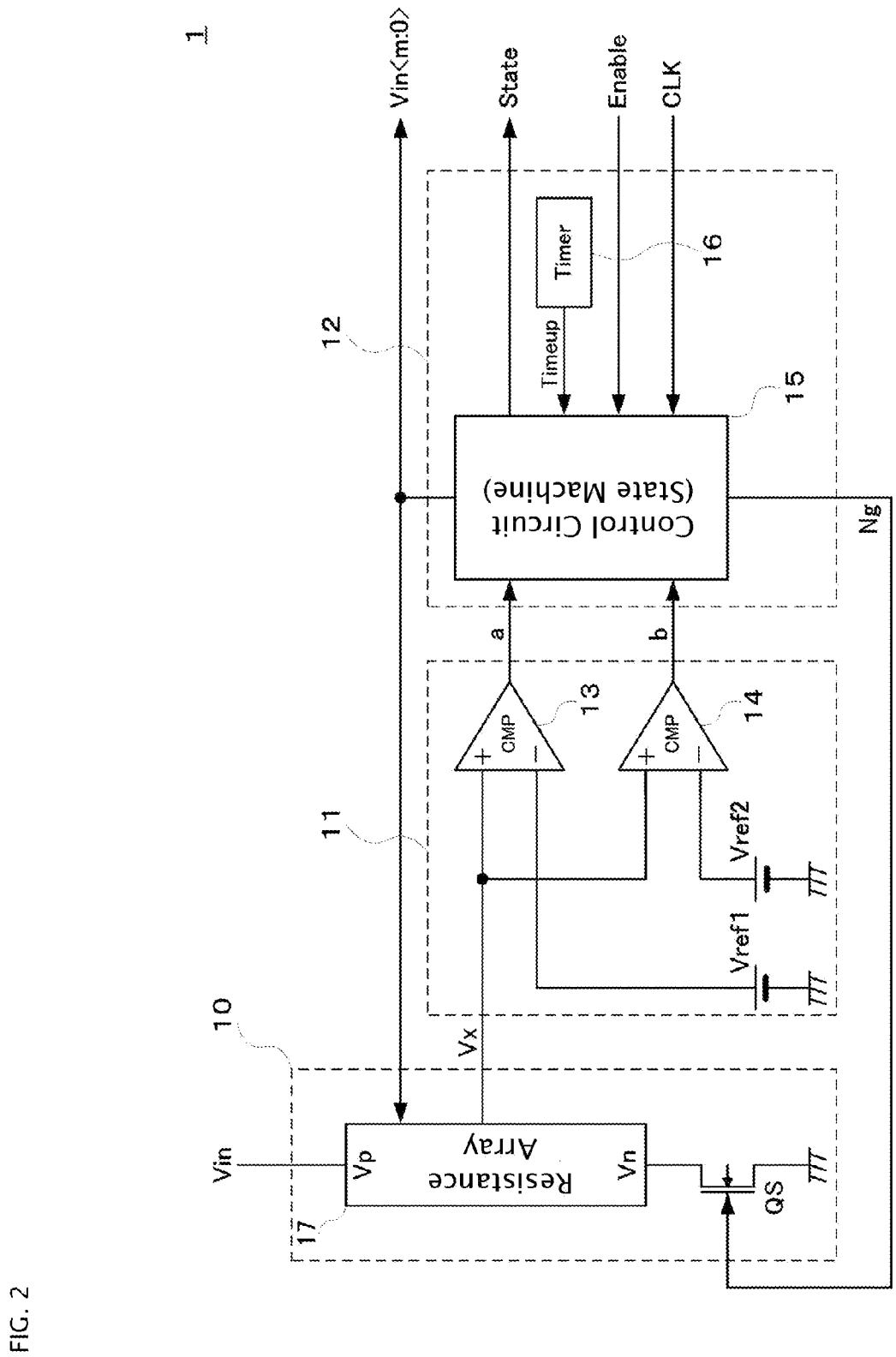
FIG. 2 shows an embodiment example of an input voltage detection circuit of a digital control switching regulator according to the present invention.

FIG. 2 shows an example of circuit construction of the input voltage detection circuit 1 according to embodiments of the invention. The input voltage detection circuit 1 as shown in FIG. 2 comprises a voltage dividing circuit 10, a comparator section 11, and a control section 12.

The voltage dividing circuit 10 includes a series-connected circuit composed of a resistance array 17 and the switching element QS between an input voltage Vin and the ground potential GND, and outputs a divided voltage Vx from the resistance array 17.

The comparator section 11 includes two reference voltage sources for outputting two reference voltages Vref1 and Vref2, and two comparator circuits 13 and 14. The comparator circuit 13 compares the inputted divided voltage Vx with the reference voltage Vref1 and outputs a compared signal a, and the comparator circuit 14 compares the inputted divided voltage Vx with the reference voltage Vref2 and outputs a compared signal b.

The control section 12 includes a control circuit 15 (which is a state machine) and a timer circuit 16. The control circuit 15 controls a resistance value of the resistance array 17 of the voltage dividing circuit 10 with a binary digital signal based on the inputted comparison signals a and b so that the divided voltage Vx of the input voltage Vin has a value between the reference voltage Vref1 and the reference voltage Vref2, and outputs a binary signal of input voltage digital signal Vin<m:0>.

The timer circuit 16 outputs a period signal Timeup for controlling start and stop of detection operation of the input voltage Vin. Based on the period signal Timeup, the control circuit 15 outputs a gate signal Ng to ON/OFF control the switching element QS of the voltage dividing circuit 10. On a time of detection operation of the input voltage, the gate signal Ng is made at the Hi (high) level to turn ON the switching element QS and produce electric current flow in the voltage dividing circuit 10 generating the divided voltage Vx. On a time of stopping the detection operation, the gate signal Ng is made at the Lo (low) level to turn OFF the switching element QS and cut off the electric current flow in the voltage dividing circuit 10 achieving low power consumption.

Figure 3:
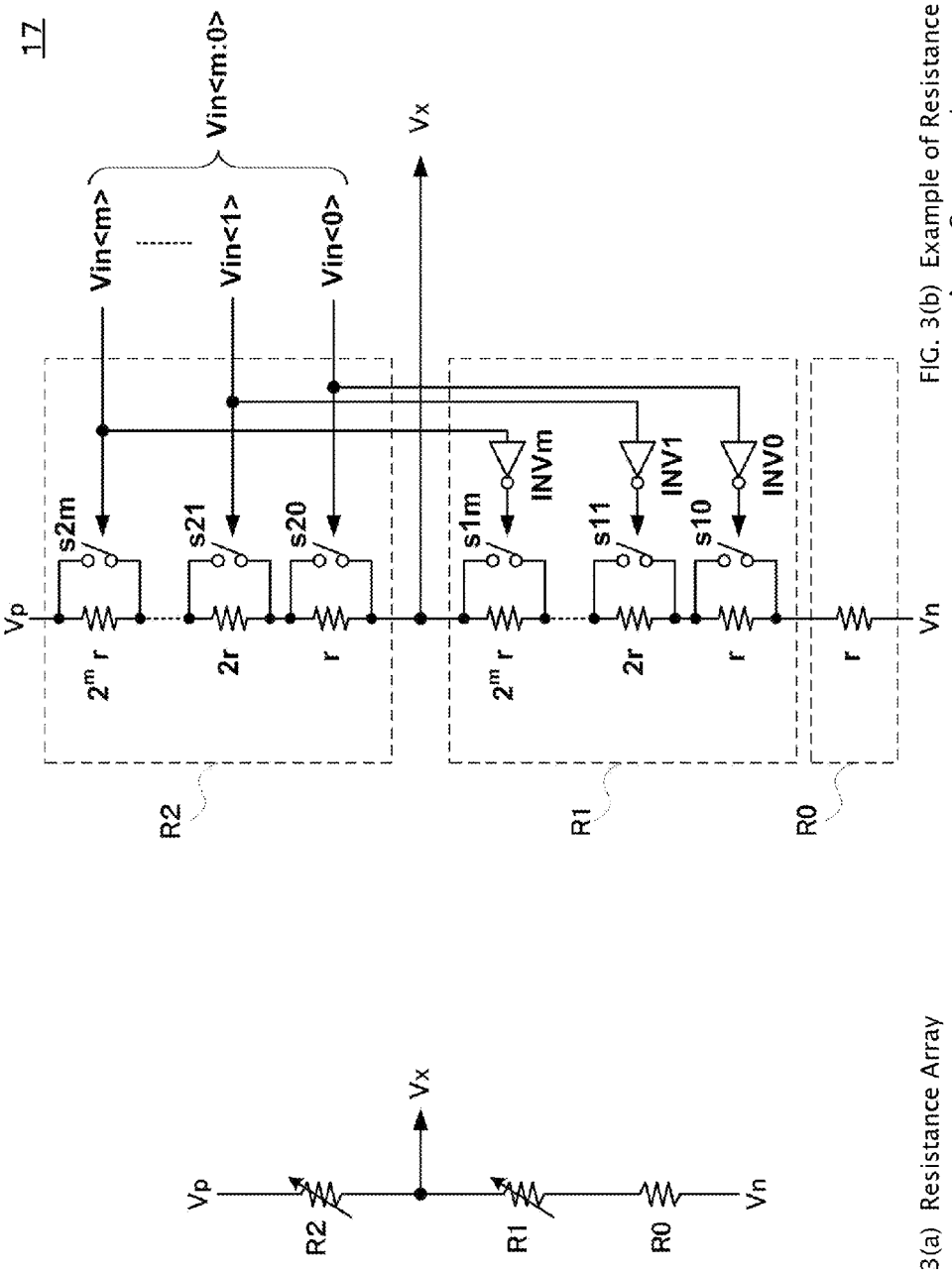
FIGS. 3(a) and 3(b) show an embodiment example of resistance array composing an input voltage detection circuit in a digital control switching regulator of the present invention.

FIGS. 3(a) and 3(b) show an example of circuit construction of the resistance array 17 according to the invention. The resistance array 17 as shown in FIG. 3(a) is composed of a variable resistance circuit R2, a variable resistance circuit R1, and a resistance element R0 series connected between connection terminals Vp and Vn, and outputs a divided voltage Vx from the node between the variable resistance circuit R2 and the variable resistance circuit R1.

The divided voltage Vx in the voltage dividing circuit 10 of FIG. 3(a) is given by the following Formula (4), wherein the ON resistance of the switching element QS is assumed negligible, and the resistance values are represented by the same symbols as those of the variable resistance circuits and the resistance element.

[Formula 4]

$$Vx = \frac{R0 + R1}{R0 + R1 + R2} Vin \quad (4)$$

The input voltage Vin is represented by the following Formula (5) using the Formula (4).

[Formula 5]

$$Vin = \frac{R0 + R1 + R2}{R0 + R1} Vx \quad (5)$$

Formula (5) shows that the input voltage Vin can be obtained by controlling the variable resistance values R1 and R2 when the divided voltage Vx and the resistance value R0 are fixed.

FIG. 3(b) shows an example of detailed circuit construction of the resistance array 17. The resistance array 17 of FIG. 3(b) is composed of a variable resistance circuit R2, a variable resistance circuit R1, and a resistance element R0 connected in series between the connection terminals Vp and Vn. Each of the variable resistance circuits R2 and R1 is composed of series-connected pairs of a resistance element and a switch that are parallel-connected. Those resistance elements have weighted resistance values $r, 2r, \ldots, 2^m r$, wherein r is a resistance value of the resistance element R0. Those switches can be semiconductor switching elements such as PMOS-FETs.

Each of the switches s20 to s2m of the variable resistance circuit R2 is ON/OFF controlled by the binary input voltage digital signal Vin<m:0> outputted from the control circuit 15; and each of the switches s10 to s1m of the variable resistance circuit R1 is ON/OFF controlled by the binary input voltage digital signal Vin <m:0> that is outputted from the control circuit 15 and inverted by invertors INV0 to INVm. Two switches s2i and s1i (i=0, 1, . . . , m) having the same weighting factor in the variable resistance circuit R2 and the variable resistance circuit R1 are ON/OFF-controlled in a complementary manner, which means that one of the switches s2i and s1i is in the ON state, the other is in the OFF state. In the ON state of the switch, the resistance element is short-circuited (the ON resistance of the semiconductor switching element is assumed negligible), and in the OFF state of the switch, the resistance element has the weighted resistance value.

Thus, a resistance value of the resistance circuit of series-connected variable resistance circuit R2 and variable resistance circuit R1 can be variably controlled by combining ON and OFF states of the switches in the variable resistance circuits R2 and R1.

Figure 4:
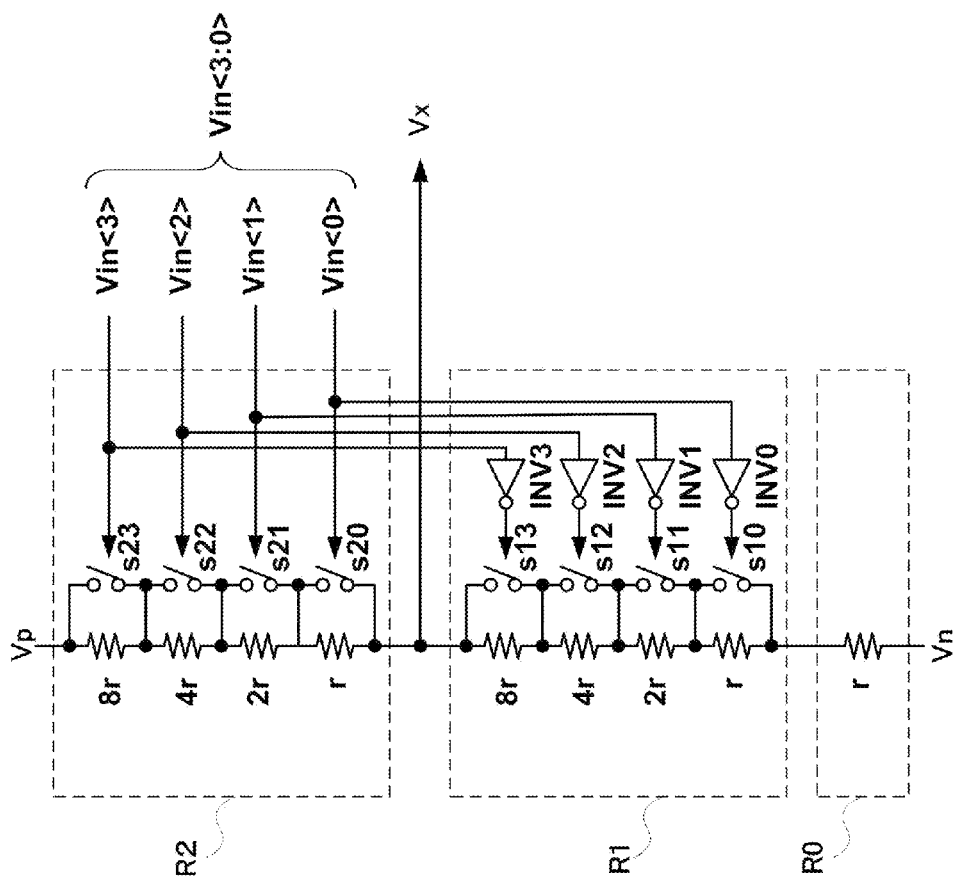
FIG. 4 shows an embodiment example of resistance array in the case of four bits composing an input voltage detection circuit in a digital control switching regulator of the present invention.

Next, the operation principle of the resistance array 17 is described in the following referring to FIG. 4. The construction example of FIG. 4 is for a case of the input voltage digital signal of 4 bits, represented by Vin <3:0> (m=3) and controlled by four digital signal lines. In the case of four bits, weighted resistance values of the resistance elements composing the variable resistance circuit R2 are 8r ($2^3$r), 4r ($2^2$r), 2r ($2^1$r), and r ($2^0$r); and weighted resistance values of the resistance elements composing the variable resistance circuit R1 are, as same as those in the variable resistance circuit R2, 8r ($2^3$r), 4r ($2^2$r), 2r ($2^1$r), and r ($2^0$r). The input voltage digital signal Vin<3:0> is fed to the switches s23 to s20 of the variable resistance circuit R2, and via the invertors INV3 to INV0, fed to the switches s13 to s10 of the variable resistance circuit R1. The switches s23, s22, s21 and s20 of the variable resistance circuit R2 are controlled by the input voltage digital signals Vin <3>, Vin <2>, Vin <1>, and Vin <0>, and the switches s13, s12, s11 and s10 of the variable resistance circuit R1 are controlled by the input voltage digital signals Vin <3>, Vin <2>, Vin <1>, and Vin <0> after inverted by the invertors INV3, INV2, INV1, and INV0.

Here, such a situation is considered that the switch is in the ON state for the input voltage digital signal Vin <m:0>=0 (a Lo level) and the switch is in the OFF state for the input voltage digital signal Vin <m:0>=1 (a Hi level).

In the case the input voltage digital signal Vin <3:0>=1000, for example, the states of the switches of the weighted resistance elements 8r, 4r, 2r, and r of the variable resistance circuit R2 are s23: OFF, s22: ON, s21: ON, and s20: ON, resulting in the variable resistance value R2=8r. On the other hand, the states of the switches of the weighted resistance elements 8r, 4r, 2r, and r of the variable resistance circuit R1 are s13: ON, s12: OFF, s11: OFF, and s10: OFF, resulting in the variable resistance value of R1=7r. Therefore, the divided voltage Vx and the input voltage Vin turn out to be as shown by the following Formulas (6) and (7).

[Formula 6]
$$Vx = \frac{r+7r}{r+7r+8r} Vin = \frac{8}{16} Vin \quad (6)$$

[Formula 7]
$$Vin = \frac{16}{8} Vx \quad (7)$$

Likewise, in the case Vin <3:0>=1001, the states of the switches of the weighted resistance elements 8r, 4r, 2r and r of the variable resistance circuit R2 are s23: OFF, s22: ON, s21: ON, s20: OFF, resulting in the variable resistance value of R2=9r. On the other hand, the states of the switches of the weighted resistance elements 8r, 4r, 2r and r of the variable resistance circuit R1 are s13: ON, s12: OFF, s11: OFF and s10: ON, resulting in the variable resistance value of R1=6r. Therefore, the divided voltage Vx and the input voltage Vin turn out to be as shown by the following Formulas (8) and (9).

[Formula 8]
$$Vx = \frac{r+6r}{r+6r+9r} Vin = \frac{7}{16} Vin \quad (8)$$

[Formula 9]
$$Vin = \frac{16}{7} Vx \quad (9)$$

As described above, fixing the divided voltage Vx and the resistance value R0, the input voltage Vin can be obtained by controlling the variable resistance values R1 and R2. More specifically, for fixed values of divided voltage Vx and resistance value R0, resistance values of the variable resistance circuit R1 and the variable resistance circuit R2 are controlled by binary digital signals so that the divided voltage Vx satisfies an inequality: reference voltage Vref2<divided voltage Vx<reference voltage Vref1.

Digital values of the digital signals are taken as the input voltage digital signal Vin<m:0>. Thus, the input voltage Vin can be converted to the input voltage digital signal Vin <m:0>.

Figure 5:
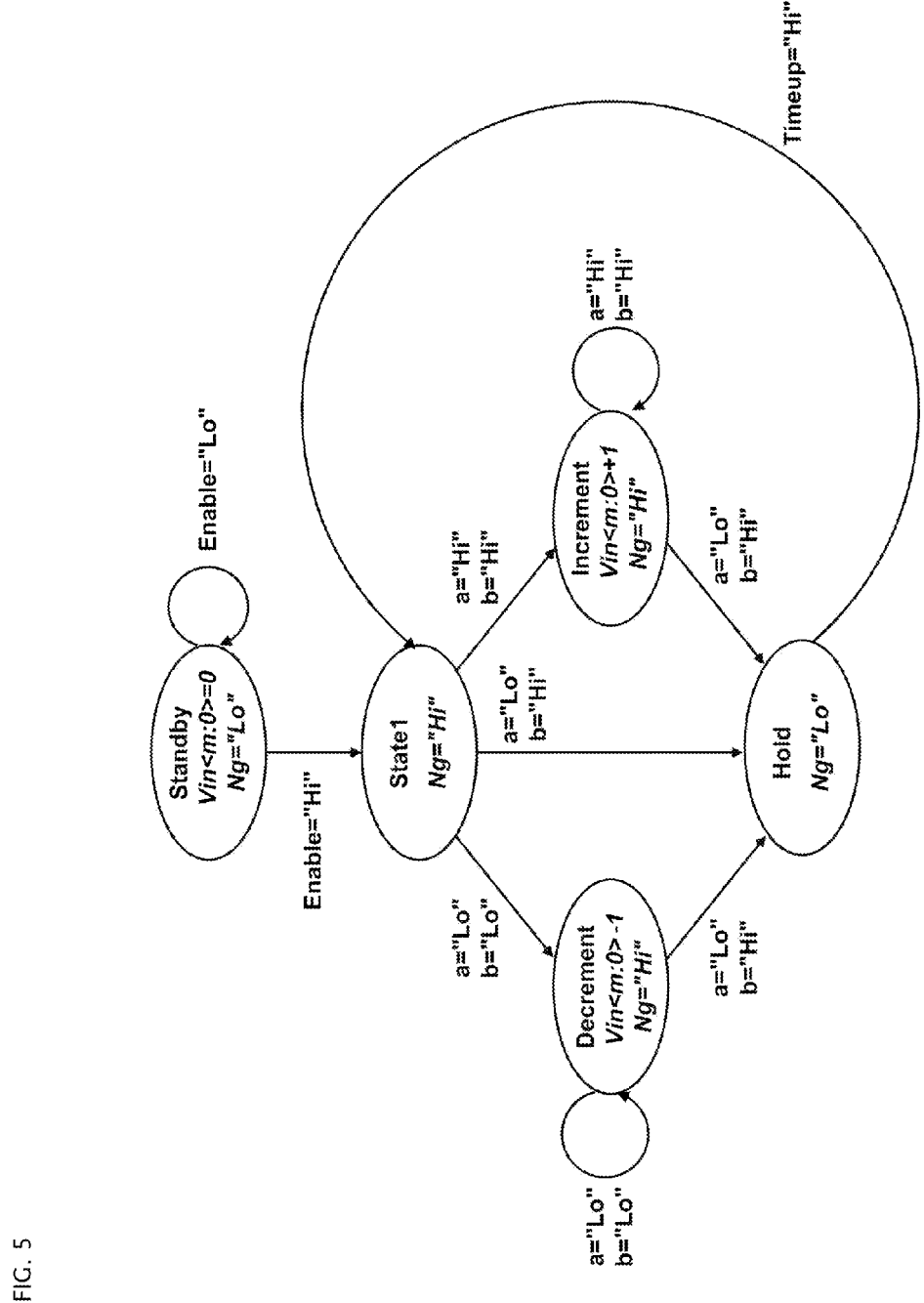
FIG. 5 shows transition of states in detection operation of an input voltage detection circuit in an embodiment example of digital control switching regulator of the present invention.

Next, FIG. 5 shows transition of states illustrating operation of a control section 12 of the input voltage detection circuit 1 in the embodiment example of digital control switching regulator of the invention.

When an enable signal Enable is set to the Lo level, the control circuit 15 (see also FIG. 2) is in a standby state, in which the input voltage digital signal Vin <m:0> is set to an initial value 0, and the gate signal Ng is set to the Lo level.

Upon transition of the enable signal Enable to the Hi level, the control circuit 15 shifts to State 1, in which the gate signal Ng changes to the Hi level, detection operation of the input voltage Vin starts, and a divided voltage Vx determined by the Formula (4) is outputted.

In the condition of State 1, when the compared signal a=Lo level, and the compared signal b=Lo level, in which divided voltage Vx<reference voltage Vref1 and divided voltage Vx<reference voltage Vref2, the control circuit 15 transitions to Decrement state, and repeats decrement operation (Vin<m:0>−1) on the input voltage digital signal Vin<m:0>. When the compared signals change to compared signal a=Lo level and compared signal b=Hi level, in which reference voltage Vref2<divided voltage Vx<reference voltage Vref1, the control circuit 15 transitions to Hold state and holds the input voltage digital signal Vin<m:0>.

In the Hold state, the gate signal Ng is at the Lo level. The operation for detecting the input voltage Vin is halted and the electric current between the input voltage Vin and the ground potential GND is cut off to achieve low power consumption.

When the compared signal a=Hi level, and the compared signal b=Hi level in the State 1, in which reference voltage Vref1<divided voltage Vx and reference voltage Vref2<divided voltage Vx, the control circuit 15 transitions to Increment state and repeats increment operation (Vin<m:0>+1) on the input voltage digital signal Vin<m:0>. As in the Decrement state, when the compared signals change to compared signal a=Lo level and compared signal b=Hi level, in which reference voltage Vref2<divided voltage Vx<reference voltage Vref1, the control circuit 15 transitions to the Hold state and holds the input voltage digital signal Vin<m:0>.

When the compared signal a=Lo level and the compared signal b=Hi level in the State 1, in which reference voltage Vref2<divided voltage Vx<reference voltage Vref1, the control circuit 15 directly transitions to the Hold state and holds the input voltage digital signal Vin<m:0> at that moment.

When the period signal Timeup from the timer circuit 16 changes to the Hi level, the Hold state is forced to transition to the State 1 again to resume the detection operation of the input voltage Vin. Thus, the input voltage Vin is periodically detected during operation of the switching regulator. When the period signal Timeup is made equal to the switching period T, for example, the input voltage Vin is detected in a pulse-by-pulse scheme.

When the enable signal Enable is connected commonly to an enable signal or a reset signal of the switching regulator, the first detection operation of the input voltage is executed at the start up of the switching regulator and the detection operation during the steady state operation of the switching regulator is conducted at every periodical times determined by the period signal Timeup.

Next, the operation of the input voltage detection circuit 1 is described for a specific example in the following. In this example, input voltage Vin=6 V, reference voltage Vref1=1.01 V, reference voltage Vref2=0.99 V, and resistance of the resistance element in the voltage dividing circuit 10 R0=r (Ω). In the case the enable signal (Lo active) of the switching regulator is common to the enable signal Enable of the input voltage detection circuit 1, the control circuit 15 is in the Standby state during the enable signal Enable is at the Lo level and the input voltage digital signal Vin<m:0> is set at the initial value 0 (zero). In the situation the switch of the variable resistance circuit R2 is in the ON state for the input voltage digital signal Vin <m:0>=0 (a Lo level) and the switch is in the OFF state for the input voltage digital signal Vin <m:0>=1 (a Hi level), every switch of the variable resistance circuit R2 is in the ON state according to the zero value of the input voltage digital signal Vin<m:0>, resulting in a resistance value of the variable resistance circuit R2=0 (Ω).

Upon change of the enable signal Enable into the Hi level, the control circuit 15 transitions to the State 1. Since the resistance value of the variable resistance circuit R2=0 (Ω) at this moment, the divided voltage Vx=the input voltage=6 V. Because the reference voltage Vref1<divided voltage Vx and the reference voltage Vref2<the divided voltage Vx, the compared signals become the compared signal a=Hi level and the compared signal b=Hi level. The control circuit 15 transitions to Increment state and increases the input voltage digital signal Vin<m:0>.

When the input voltage digital signal Vin<m:0> is increased, the resistance value of the variable resistance circuit R2 increases and the resistance value of the variable resistance circuit R1 decreases, thus, the divided voltage Vx decreases. The control circuit 15 repeats the increment operation and when the divided voltage Vx becomes to a value satisfying the condition: the reference voltage Vref2=0.99 V<the divided voltage Vx<the reference voltage Vref1=1.01 V, the control circuit 15 transitions to the Hold state.

The digital signal for ON/OFF control of the switches in the variable resistance circuit R2 is the input voltage digital signal Vin<m:0> and inputted to the digital control circuit 4 for controlling the PWM duty ratio of the switching regulator.

In the input voltage detection circuit 1, when the periodically changing period signal Timeup becomes to the Hi level, the control circuit 15 transitions to the State 1 holding the input voltage digital signal Vin<m:0>, and the operation for detecting the input voltage is repeated in the manner as described above.

The resolution Vrs of the input voltage detection circuit 1 in the present invention is determined by the maximum value of the input voltage Vin and the bit number m of the input voltage digital signal Vin<m:0>. In an example of the maximum value of the input voltage Vin (max)=12 V and the bit number m=8, the resolution Vrs is given by the Formula (10).

[Formula 10]

$$Vrs = \frac{Vin(\text{max})}{2^m} = \frac{12}{256} = 46.9 \text{ mV} \quad (10)$$

Thus, change of one LSB (least significant bit) of the input voltage digital signal Vin<8:0> changes the divided voltage Vx by 46.9 mV.

The reference voltage Vref1 and the reference voltage Vref2 must be set to satisfy the inequality of Formula (11).

[Formula 11]

$$Vref1 - Vref2 > Vrs \quad (11)$$

Figure 6:
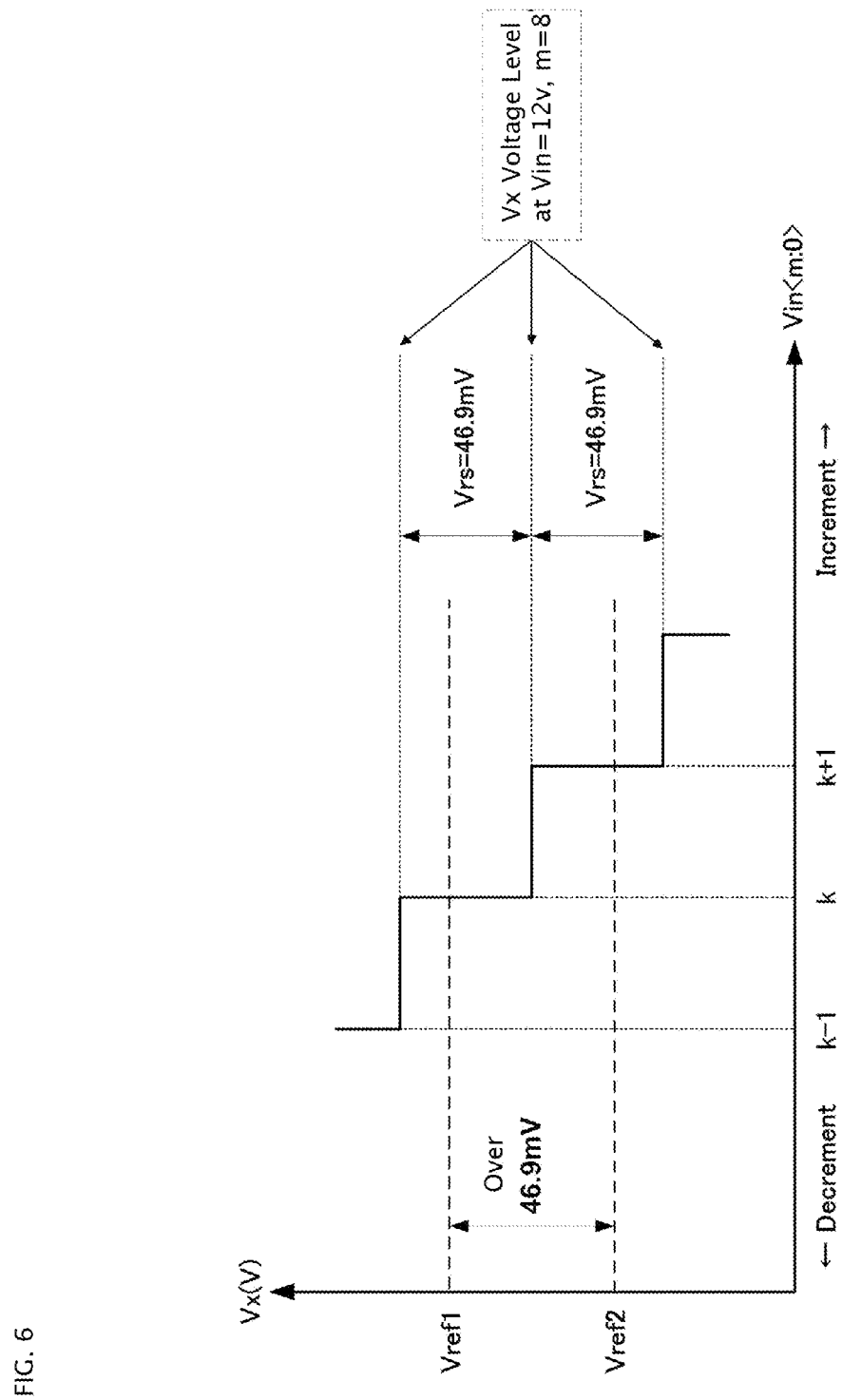
FIG. 6 shows a relationship between a reference voltage and resolution of an input voltage detection circuit in an embodiment example of digital control switching regulator of the present invention.

The detection operation of the input voltage detection circuit 1 is conducted through increment or decrement operation on the resistance value of the resistance array 17 so as to satisfy the relationship: the reference voltage Vref2<divided voltage Vx<reference voltage Vref1. Consequently, as shown in FIG. 6, at least one voltage value of the divided voltage Vx must exist between the reference voltage Vref1 and the reference voltage Vref2. In an example of: the maximum input voltage Vin (max)=12 V, the divided voltage Vx=1 V, and the bit number m=8, the resolution turns out to be Vrs=46.9 mV according to the Formula (10). Thus, reference voltages of Vref1=1.03 V and Vref2=0.97 V are allowable reference voltage values satisfying Formula (11).

The following describes a control method in the control circuit 4 according to the input voltage digital signal Vin<m:0> detected by the input voltage detection circuit 1 in the invention. The control can be performed by a digital operation of the PID operation. A discrete digital PID operation is generally represented by Formula (12).

[Formula 12]

$$d[n]=d[n-1]+A \cdot e[n]+B \cdot e[n-1]+C \cdot e[n-2] \quad (12)$$

wherein d[n] and d[n−1] are duty command signals at the present switching period and at one period before, respectively; e[n], e[n−1], and e[n−2] are digital error signals at the present switching period, at one period before, and at two period before, respectively; and A, B, and C are controller coefficients.

The input voltage Vin in a switching regulator may vary during operation like in a battery input power. Accordingly, the controller coefficients that are set in the initial design are to be reset to optimum values. A digital control switching regulator of the invention performs the optimum control of the controller coefficients by the input voltage digital signal Vin<m:0> detected in the input voltage detection circuit 1.

Figure 7:
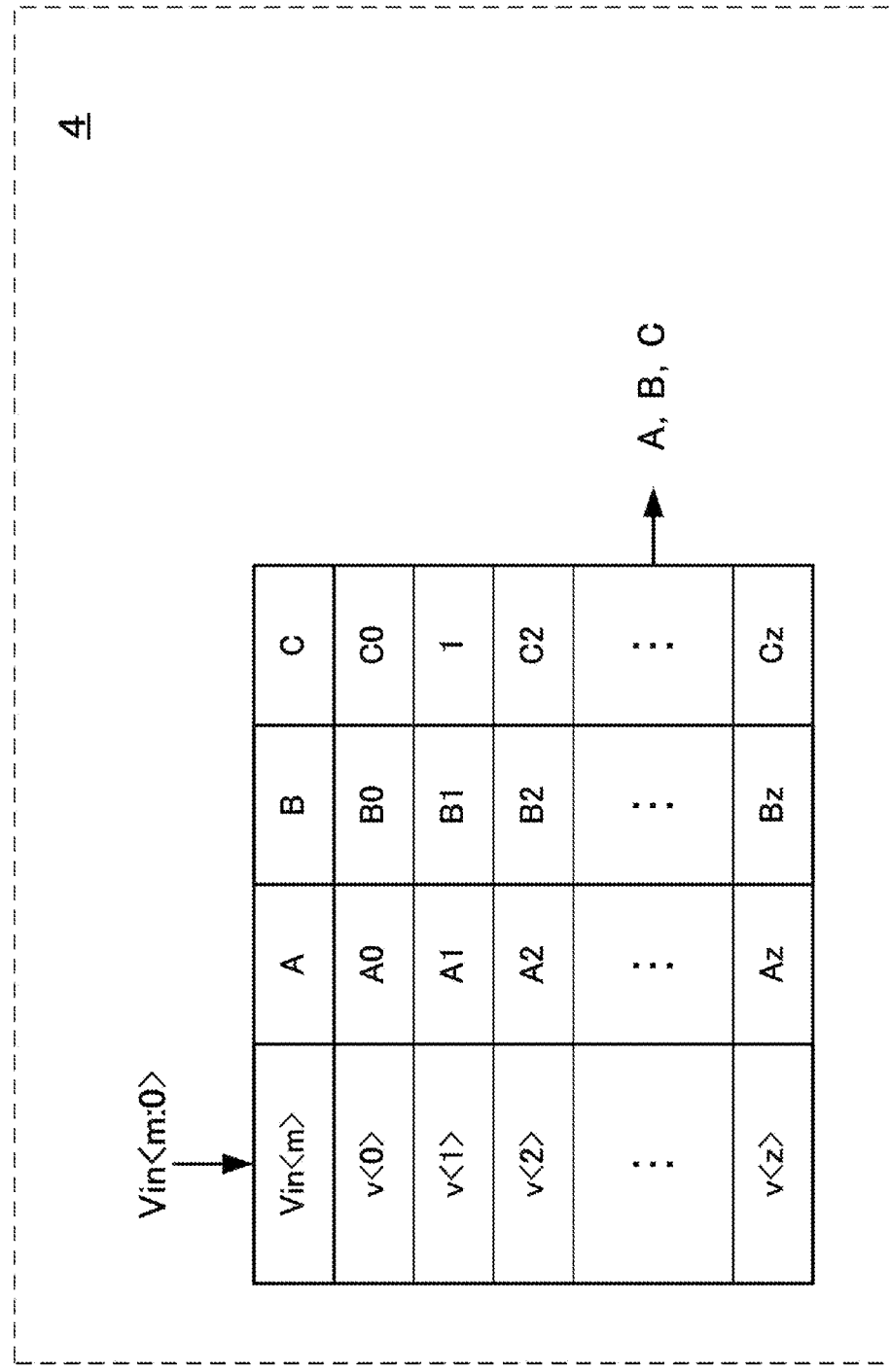
FIG. 7 shows an example of optimization of controller coefficients in a digital control circuit in an embodiment example of digital control switching regulator of the present invention.

FIG. 7 shows an example of a control method of the controller coefficients. As shown in FIG. 7, the controller coefficients A, B, and C are stored preliminarily in the control circuit 4 corresponding to the input voltage digital signal Vin<m:0> in a table format. Controller coefficients A, B, and C are selected corresponding to the input voltage digital signal Vin<m:0> that is detected at every periodical time of the period signal Timeup, and operation control is conducted according to Formula (12) to perform optimum control responding to the variation of the input voltage Vin.

The digital control of the digital control circuit 4 can be performed by a digital PI control in the same manner as the digital PID control described above. A discrete digital PI operation is generally represented by Formula (13).

[Formula 13]

$$d[n]=d[n-1]+A \cdot e[n]+B \cdot e[n-1] \quad (13)$$

wherein d[n] and d[n−1] are duty command signals at the present switching period and at one period before, respectively; e[n] and e[n−1] are digital error signals at the present switching period and at one period before, respectively; and A and B are controller coefficients.

The controller coefficients A and B are preliminarily stored in the digital control circuit 4 in a table format as in FIG. 7 corresponding to the input voltage digital signal Vin<m:0>. The controller coefficients A and B are selected that correspond to the input voltage digital signal Vin<m:0> detected at every periodical time of Timeup signal, and operation control is conducted according to Formula (13) performing an optimum control responding to variation of the input voltage Vin.

As described previously, a digital control switching regulator of the invention comprises the input voltage detection circuit 1 and eliminates needs for detection of an output current value and an inductance value. An input voltage Vin is converted to an input voltage digital signal Vin<m:0>, which is used for controlling the controller coefficient of the digital control circuit 4 to the optimum value to perform optimum control responding to variation of the input voltage Vin. The input voltage detection circuit 1 is controlled by a gate signal Ng to cut off a current path in the voltage dividing circuit 10 when detection operation of the input voltage Vin is halted. Thus, low power consumption is also achieved.

Although the present invention has been described relating to a preferred embodiment example, the invention is not limited to the example but wide variety of improvements and variations are possible as long as they do not deviate from the spirit and scope of the invention.

This application is based on, and claims priority to, Japanese Patent Application No. 2010-049208, filed on Mar. 5, 2010, and Japanese Patent Application No. 2010-236393, filed on Oct. 21, 2010. The disclosure of each priority applications, in its entirety, including the drawings, claims, and the specification thereof, is incorporated herein by reference.

What is claimed is:

1. A digital control switching regulator, ON/OFF-controlling switching elements by digital-controlled pulse width modulation signals and converting an input voltage to a desired output voltage, the switching regulator comprising an input voltage detection circuit that includes:
    a voltage dividing circuit outputting a divided voltage of the input voltage,
    a comparator section comparing the divided voltage of the input voltage with a first reference voltage and a second reference voltage and outputting comparison signals indicating comparison results, and
    a control section controlling a dividing ratio of the voltage dividing circuit based on the comparison signals so that the divided voltage equals a predetermined voltage, thereby outputting an input voltage digital signal that indicates a magnitude of the input voltage,
    the input voltage digital signal controlling controller coefficients for use in the digital control.

2. The digital control switching regulator according to claim 1, wherein
    the voltage dividing circuit comprises a resistance array having variable resistance circuits and a resistance element, the variable resistance circuits and a resistance element being disposed between the input voltage and a ground potential, the voltage dividing circuit outputting the divided voltage from the resistance array;
    the comparator section comprises a first reference voltage source and a second reference voltage source outputting the first reference voltage and the second reference voltage, respectively, and a first comparison circuit and a second comparison circuit comparing the divided voltage of the input voltage with the first reference voltage and with the second reference voltage, respectively, to output the comparison signals; and
    the control section controls the dividing ratio of the divided voltage of the input voltage based on the comparison signals for setting the divided voltage of the input voltage to lie between the first reference voltage and the second reference voltage, and generating the input voltage digital signal according to the dividing ratio.

3. The digital control switching regulator according to claim 2, wherein the input voltage detection circuit further comprises a timer circuit setting a detection period with which operation for detecting the input voltage is conducted.

4. The digital control switching regulator according to claim 2, wherein the resistance array comprises a series-connected circuit of a first variable resistance circuit, a second variable resistance circuit, and the resistance element, and the divided voltage is output from a connection point between the first variable resistance circuit and the second variable resistance circuit.

5. The digital control switching regulator according to claim 2, wherein the voltage dividing circuit further comprises a switching element that is series-connected to the resistance array and ON/OFF-controlled by an output signal from the control section to be turned off at an end of the operation for detecting the input voltage and to cut off an electric current in the voltage dividing circuit.

6. The digital control switching regulator according to claim 2, wherein
    the variable resistance circuit of the resistance array comprises a plurality of series-connected pairs of a resistance element and a switch, the both being connected in parallel each other, and the resistance element having a weighted resistance value; and
    the control section controls ON/OFF operation of the switch based on the comparison signals to adjust the dividing ratio of the divided voltage of the input voltage and determines the input voltage digital signal according to ON/OFF states of the switches in the condition of the divided voltage of the input voltage lying between the first reference voltage and the second reference voltage.

7. The digital control switching regulator according to claim 4, wherein each of the switches of the first variable resistance circuit and corresponding member of the switches of the second variable resistance circuit are complementarily ON/OFF-controlled by the input voltage digital signal.

8. The digital control switching regulator according to claim 6, wherein each of the switches of the first variable resistance circuit and corresponding member of the switches of the second variable resistance circuit are complementarily ON/OFF-controlled by the input voltage digital signal.

9. The digital control switching regulator according to claim 1, wherein the digital control includes digital PID operation or digital PI operation using a set of controller coefficients that is changed according to the input voltage digital signal.

10. The digital control switching regulator according to claim 2, wherein the digital control includes digital PID operation or digital PI operation using a set of controller coefficients that is changed according to the input voltage digital signal.

* * * * *